H. CHESHER.
NUT LOCK.
APPLICATION FILED OCT. 21, 1912.
1,082,734.
Patented Dec. 30, 1913.
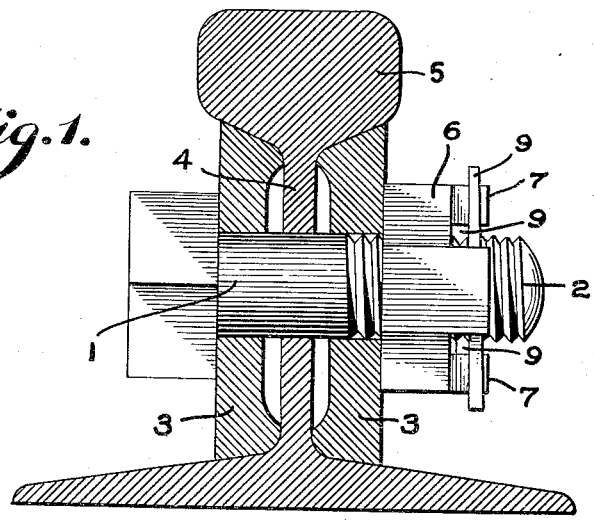
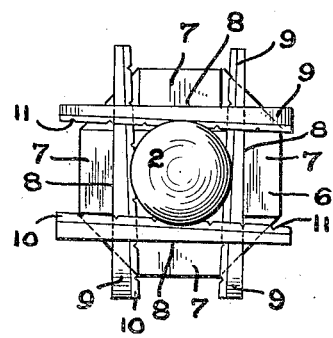
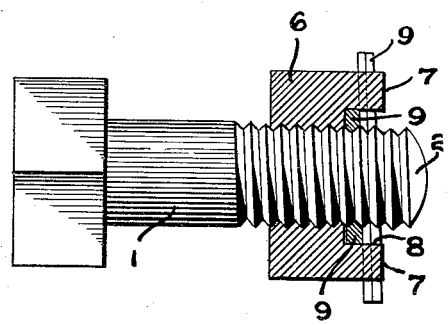
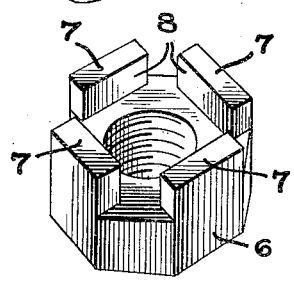
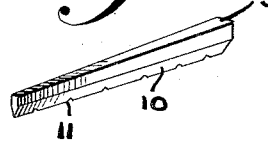
Inventor
Harry Chesher.
Witnesses
By Joshua R. H. Potts
Attorney

UNITED STATES PATENT OFFICE.

HARRY CHESHER, OF PHILADELPHIA, PENNSYLVANIA.

NUT-LOCK.

1,082,734.  Specification of Letters Patent.  Patented Dec. 30, 1913.

Application filed October 21, 1912. Serial No. 726,858.

*To all whom it may concern:*

Be it known that I, HARRY CHESHER, a citizen of the United States, residing at Philadelphia, in the county of Philadelphia and State of Pennsylvania, have invented certain new and useful Improvements in Nut-Locks, of which the following is a specification.

My invention relates to improvements in nut locks, the object of the invention being to provide an improved construction of nut and improved means for locking the nut on the bolt without injury to the bolt or nut, so that they may be used again and again.

A further object is to provide an improved construction of nut, and a plurality of crossed locking keys wedging between the nut and the bolt located in the threads of the bolt and wedging between each other, whereby the nut is securely held.

With these and other objects in view, the invention consists in certain novel features of construction and combinations and arrangements of parts as will be more fully hereinafter described and pointed out in the claims.

In the accompanying drawings: Figure 1 is a view in longitudinal section illustrating my improved nut lock for use in connection with a rail joint. Fig. 2 is an end elevation of the nut showing the same in locked position. Fig. 3 is a view in longitudinal section of Fig. 2. Fig. 4 is a perspective view of the nut, and Fig. 5 is a perspective view of one of the locking keys.

1 represents a bolt having a screw-threaded end 2, and in Fig. 1 I have illustrated a bolt as positioned through fish plates 3 and through the web 4 of a rail 5 to illustrate the application of my improvements in connection with a rail joint. On the screw-threaded end 2 of bolt 1, my improved nut 6 is located. This nut 6 on its outer face is recessed, so that four lugs 7 are provided which have straight inner walls 8 spaced from the bolt opening in the nut, and said straight inner walls 8 located in a plane appreciably outside of the plane of the end walls of the lugs, so that locking keys 9 may be positioned between any and all of said lugs, and the ends of said keys projected beyond the outer surfaces of the nut as clearly shown in Fig. 2. Each key 9 tapers in two directions from one end to the other. In other words, the key is thickest at one end and gradually grows thinner toward the other end, and at its thicker end is deeper or wider and gradually tapers toward its thinner end, and one edge of this key throughout its length is beveled as shown at 10 to fit between the threads of the bolt, and this beveled edge is notched as shown at 11, whereby the sharp edge is serrated and the key is permitted to cut its own way into the bolt between the threads thereof.

In operation, the nut is screwed into position on the bolt, and the keys are positioned transversely of the bolt between the lugs 7 and the bolt with the sharp edges 10 of the keys located between the threads of the bolt, and said keys are driven longitudinally by means of blows from any suitable tool, so that they tightly wedge in place.

It is my intention to lock by means of a plurality of keys. While I have shown four keys in Fig. 2, it is to be understood that this number may of course be varied. The keys are located at right angles to each other, so that they not only wedge laterally of the bolt, but they wedge longitudinally of the bolt due to the fact that the keys are wedge shape in two directions.

In assembling the parts, the two substantially parallel keys are located on opposite sides of the bolt and spaced slightly from the nut and then the other keys are located between the first-mentioned keys and the end of the nut, and when driven in place, they wedge in both directions, thereby effectually securing the parts against movement. When it is desired to remove the nut, it is a simple matter to drive the keys out of locking position, as they are longer than the nut is wide and blows may be readily imparted to the smaller ends of the keys.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. In a nut lock, the combination with a nut having lugs on one face, each lug having a straight inner face spaced from the bolt opening in the nut, and in a plane outside of the ends of the other lugs, and keys adapted to be positioned between the lugs and the bolt on which the nut is screwed, said keys positioned at right angles to each other, and tapering in two directions, substantially as described.

2. The combination with a screw-threaded bolt, and a nut screwed thereon, integral lugs on the outer face of the nut, each lug having a straight inner face, spaced from the bolt opening in the nut, and in a plane outside of the plane of the ends of the other lugs, wedge shaped keys located between the lugs and the bolt, said keys positioned between the threads of the bolt, and said keys located at right angles to each other and wedging both longitudinally and transversely of the bolt, substantially as described.

In testimony whereof I have signed my name to this specification in the presence of two subscribing witnesses.

HARRY CHESHER.

Witnesses:
C. R. ZIEGLER,
S. W. FOSTER.

Copies of this patent may be obtained for five cents each, by addressing the "Commissioner of Patents, Washington, D. C."